Nov. 15, 1955   R. M. SMITH   2,724,088
TACHOMETER DEVICE
Filed Sept. 22, 1951
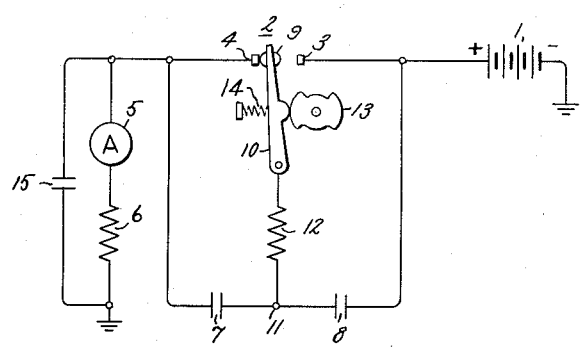
Inventor:
Russell M. Smith,
by Ernest␣H.␣Britton
His Attorney.

United States Patent Office 2,724,088
Patented Nov. 15, 1955

2,724,088

TACHOMETER DEVICE

Russell M. Smith, Ripley, N. Y., assignor to General Electric Company, a corporation of New York Application September 22, 1951, Serial No. 247,827

2 Claims. (Cl. 324—70)

This invention relates to tachometer devices and more particularly to electrical tachometers of the type utilizing a capacitor alternately connected in series with a direct current source and a current measuring device, and disconnected therefrom at a rate proportional to the speed of the apparatus the speed of which is to be measured so that the charging current of the capacitor varies with the frequency with which the capacitor is connected and disconnected from the source and the current measuring device therefore provides a direct indication of the speed of the apparatus.

Electrical tachometers of the type indicated above have been constructed in the past. However, they have had the disadvantage that at low speeds a ripple frequency is impressed on the current-measuring ammeter thus making accurate speed measurement difficult or impossible.

It is therefore an object of this invention to provide an improved electrical tachometer of the type described wherein the ripple frequency is doubled over that found in conventional instruments of this type so that accurate speed measurement at low speeds is possible.

Further objects and advantages of this invention will become apparent and the invention will be better understood by reference to the following description and the accompanying drawing, while the features of novelty which characterize this invention will be pointed out with particularity in the claims annexed to and forming a part of this specification.

In accordance with this invention, there is provided a source of direct current and a double-throw switch having a pair of stationary contacts and a movable contact. One of the stationary contacts of the switch is connected to one side of the source of direct current, and the other of the stationary contacts is connected to the other side of the source with current measuring means, such as an ammeter, arranged in series therewith. A pair of capacitors is serially connected across the stationary contacts, and the movable contact is connected to the midpoint between the capacitors. The movable contact is arranged to be connected to the apparatus, the speed of which is to be measured so that it is alternately moved from one of the stationary contacts to the other of the stationary contacts. Accordingly, one of the capacitors is alternately charged from the source while the other of the capacitors is discharged so that the current flow indicated by the current measuring device is directly proportional to the speed of the apparatus.

The single figure of the drawing schematically illustrates the circuit for the improved tachometer of this invention.

Referring now to the drawing, there is shown a source of direct current, such as a battery 1, having its negative side connected to ground as indicated. A single-pole, double-throw switch 2 is provided having stationary contacts 3 and 4 with stationary contact 3 being connected to the positive side of the battery 1 and stationary contact 4 being connected to ground with a suitable current measuring device, such as ammeter 5 and a resistor 6 arranged in series therewith. A pair of capacitors 7 and 8 are serially connected across the stationary contacts 3 and 4 of the double-throw switch 2 and the movable contacts 9 of the double-throw switch 2, which are carried by movable element 10, are connected to the midpoint 11 between the capacitors 7 and 8 with a resistor 12 arranged in series therewith. The movable element 10 of the double-throw switch 2 is arranged to be moved so that the movable contacts 9 alternately contact the stationary contacts 3 and 4 by means of a suitable cam device 13 which is adapted to be connected to the apparatus, the speed of which is to be measured (not shown). A suitable spring 14 biases the movable element 10 against the cam 13. A filter capacitor 15 is connected across the ammeter 5 and the resistor 6.

In operation, with the cam 13 rotating at a speed proportional to the speed of the apparatus and assuming that the movable element 10 and the movable contacts 9 are as shown in the drawing, current will flow from the battery 1 through capacitor 8, resistor 12, movable contacts 9, stationary contact 4, ammeter 5 and resistor 6 to ground, thus charging the capacitor 8. As the cam 13 continues to rotate, the movable element 10 will move to the right opening the connection between stationary contact 4 and movable contact 9 and closing the connection between stationary contact 3 and movable contact 9. Thus, capacitor 7 is now connected in series with the battery 1 and the ammeter 5 for charging while capacitor 8 is discharged through the resistor 12 through the short circuit path now formed. Thus, the capacitors 7 and 8 are alternately connected for charging in series with the battery 1 and the ammeter 5 and then alternately discharged, the speed of connection being proportional to the speed of the apparatus and thus the ammeter 5 will indicate an average current directly proportional to the apparatus speed. By virtue of the utilization of the two capacitors 7 and 8 which are alternately charged and discharged, the ripple frequency which is seen by the ammeter 5 is twice that which would be found in a circuit using a single capacitor and therefore accurate speed measurement may be obtained at much lower speeds.

It will now be readily apparent that this invention provides an improved electrical tachometer arrangement characterized by its simplicity and by the fact that accurate speed measurement may be obtained at much lower speeds.

While I have illustrated and described a particular embodiment of this invention, further modifications and improvements will occur to those skilled in the art. I desire it to be understood, therefore, that this invention is not limited to the form shown, and I intend in the appended claims to cover all modifications which do not depart from the spirit and scope of this invention.

What I claim as new and desire to secure by Letters Patent of the United States is:

1. A tachometer device comprising a source of direct current, a double-throw switch having a pair of stationary contacts and a movable contact, one of said stationary contacts being connected to one side of said source, the other of said stationary contacts being connected to the other side of said source with current measuring means arranged in series therewith, a pair of capacitors serially connected across said stationary contacts, a resistance connecting the midpoint between said capacitors and said movable contact, and means adapted to be connected to the apparatus the speed of which is to be measured and arranged to alternately move said movable contact from one of said stationary contacts to the other of said stationary contacts at a rate proportional to the speed of said apparatus whereby one of said capacitors is alternately charged from said source through said current measuring means while the other of said capacitors is discharged so that the current flow indicated by said current measuring means is directly proportional to the speed of said apparatus.

2. A tachometer device comprising a source of direct current, a double-throw switch having a pair of stationary contacts and a movable contact, one of said stationary contacts being connected to one side of said source, the other of said stationary contacts being connected to the other side of said source with current measuring means and a resistanec arranged in series therewith, a filter capacitor connected across said current measuring means and said resistance, a pair of capacitors serially connected across said stationary contacts, another resistance connected at the midpoint between said capacitors and said movable contact, and means adapted to be connected to the apparatus the speed of which is to be measured and arranged to alternately move said movable contact from one of said stationary contacts to the other of said stationary contacts whereby one of said pair of capacitors is alternately charged from said source through said current measuring means while the other of said pair of capacitors is discharged so that the current flow indicated by said current measuring means is directly proportional to the speed of said apparatus.

References Cited in the file of this patent

UNITED STATES PATENTS

| 2,091,025 | Breer | Aug. 24, 1937 |
| 2,119,389 | Hunt | May 31, 1938 |
| 2,184,315 | Peters | Dec. 26, 1939 |
| 2,423,194 | Long | July 1, 1947 |
| 2,540,505 | Bliss | Feb. 6, 1951 |
| 2,555,491 | Hooven | June 5, 1951 |